United States Patent
Jeong et al.

(10) Patent No.: US 10,627,682 B2
(45) Date of Patent: Apr. 21, 2020

(54) LIQUID CRYSTAL DISPLAY DEVICE

(71) Applicant: LG Display Co., Ltd., Seoul (KR)

(72) Inventors: Song-Yi Jeong, Paju-si (KR);
Won-Taeck Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/208,917

(22) Filed: Dec. 4, 2018

(65) Prior Publication Data

US 2019/0171069 A1    Jun. 6, 2019

(30) Foreign Application Priority Data

Dec. 5, 2017    (KR) .................. 10-2017-0165802

(51) Int. Cl.
*G02F 1/1343*    (2006.01)
*G02F 1/137*    (2006.01)
(Continued)

(52) U.S. Cl.
CPC ........ *G02F 1/134309* (2013.01); *G02F 1/137* (2013.01); *G02F 1/134336* (2013.01);
(Continued)

(58) Field of Classification Search
CPC .............. G02F 1/134309; G02F 1/137; G02F 1/134336; G02F 2201/122; G02F 2001/133738; G02F 1/1337; G02F 2001/13712; G02F 1/1368; G02F 2201/123; G02F 2201/121; G02F 2001/134318; G02F 2001/13685; G02F 2001/134381; G02F 1/1343; G02F 1/13439; G02F 1/136286; G02F 1/155; G02F 1/1393; G02F 1/1395; G02F 1/136; G02F 1/218; G02F 1/134363; G02F 1/134327; G02F 1/133707; G02F 1/0316; G02F 2001/134372; G02F 2001/134345; G02F 2001/1357; G02F 2001/136218; G02F 2001/136295; G02F 2001/1552; G02F 2001/1555; G02F 2001/1557; G02F 2001/13629; G02F 2201/12; G02F 2201/124; G02F 2201/14; G02F 2202/10; G02F 1/133753; G02F 1/3775; G02F 2001/13787; G02F 2001/3548; H01L 27/124; H01L 27/3276;
(Continued)

(56) References Cited

U.S. PATENT DOCUMENTS

2004/0263749 A1* 12/2004 Jeong ............... G02F 1/134363
349/141
2010/0091231 A1* 4/2010 Nishimura ........ G02F 1/134363
349/139
(Continued)

*Primary Examiner* — Shan Liu
(74) *Attorney, Agent, or Firm* — Morgan, Lewis & Bockius LLP

(57) ABSTRACT

A liquid crystal display device includes a first substrate having a plurality of pixel regions; thin film transistors on the first substrate; a first electrode electrically connected to each of the thin film transistors and in each of the plurality of pixel regions; a passivation layer on the first electrode; a second electrode on the passivation layer and defining an opening in each of the plurality of pixel regions corresponding to the first electrode; a liquid crystal layer on the second electrode; and a second substrate on the liquid crystal layer.

9 Claims, 10 Drawing Sheets

(51) Int. Cl.
  *G02F 1/1368* (2006.01)
  *G02F 1/1337* (2006.01)
(52) U.S. Cl.
  CPC .......... *G02F 1/1337* (2013.01); *G02F 1/1368* (2013.01); *G02F 2001/13685* (2013.01); *G02F 2001/13712* (2013.01); *G02F 2001/133738* (2013.01); *G02F 2001/134318* (2013.01); *G02F 2001/134372* (2013.01); *G02F 2001/134381* (2013.01); *G02F 2201/121* (2013.01); *G02F 2201/122* (2013.01); *G02F 2201/123* (2013.01)
(58) Field of Classification Search
  CPC ............. H01L 27/3297; H01L 27/3279; H01L 27/329; H01L 23/49534; H01L 2933/0016; G09G 2300/0421; G09G 2300/0426; G09G 2300/0439; G09G 3/3659
  USPC .......................................... 349/139–148, 129
  See application file for complete search history.

(56) References Cited

U.S. PATENT DOCUMENTS

| | | | | |
|---|---|---|---|---|
| 2014/0092353 A1* | 4/2014 | Matsushima | ..... | G02F 1/133512 349/110 |
| 2014/0292732 A1* | 10/2014 | Niioka | ................... | G02B 27/22 345/204 |
| 2018/0210246 A1* | 7/2018 | Uchida | ............. | G02F 1/134309 |
| 2018/0335678 A1* | 11/2018 | Lee | ....................... | G02F 1/1368 |

* cited by examiner

|  | Ref. | First embodiment | Improvement rate |
|---|---|---|---|
| Rising time (ms) | 14.7 | 6.5 | 56% |
| Falling time (ms) | 12.5 | 5.2 | 58% |

LIQUID CRYSTAL DISPLAY DEVICE

CROSS-REFERENCE TO RELATED APPLICATIONS

This application claims the benefit under 35 U.S.C. § 119(a) of Korean Patent Application No. 10-2017-0165802, filed on Dec. 5, 2017, in the Korean Intellectual Property Office, which is incorporated herein by reference in its entirety.

BACKGROUND

Technical Field

The present disclosure relates to a liquid crystal display device, and more particularly, to a liquid crystal display device with improved response speed and transmittance as well as reduced driving voltage thereof.

Discussion of the Related Art

Generally, a liquid crystal display device is driven using optical anisotropy and a polarization property of a liquid crystal. Because the liquid crystal has a thin and long structure, the liquid crystal has directionality in an alignment of molecules. An alignment direction of the molecules can be controlled by artificially applying an electric field to the liquid crystal. Therefore, when an alignment direction of molecules of the liquid crystal is arbitrarily adjusted, the alignment of the molecules of the liquid crystal is changed, and light is refracted in the alignment direction of the molecules of the liquid crystal due to optical anisotropy so that image information can be expressed.

Currently, an active matrix liquid crystal display device (AM-LCD; hereinafter referred to as a liquid crystal display device), in which thin film transistors and pixel electrodes connected to the thin film transistors are arranged in a matrix form, is receiving the most attention because of its high resolution and superiority in displaying moving images.

The liquid crystal display device includes a color filter substrate on which a common electrode is formed, an array substrate on which pixel electrodes are formed, and a liquid crystal interposed between the two substrates. In such a liquid crystal display device, an electric field is vertically induced between the common electrode and the pixel electrodes, and the liquid crystal is driven by the electric field. The liquid crystal display device has relatively high transmittance and aperture ratio.

Further, recently, an in-plane switching (IPS) mode liquid crystal display device, in which electrodes are alternately arranged on one of upper and lower substrates and a liquid crystal is disposed between the substrates to display an image, has been developed. Typically, an IPS mode liquid crystal display device displays an image by adjusting light transmittance of a liquid crystal having dielectric anisotropy ($\Delta\varepsilon$) using an electric field. In the IPS mode liquid crystal display device, a color filter substrate on which a color filter is formed and an array substrate on which a thin film transistor is formed are attached to each other with a liquid crystal interposed therebetween.

Here, the array substrate includes a pixel electrode, a common electrode, and a thin film transistor formed for each pixel region defined by crossing of a gate line and a data line on the substrate. The thin film transistor supplies a data signal, which is provided from the data line, to the pixel electrode in response to a gate signal provided from the gate line.

The pixel electrode receives the data signal from the thin film transistor to drive the liquid crystal, and the common electrode receives a common voltage, which is a reference for driving the liquid crystal. The liquid crystal is rotated according to an electric field formed by the data signal of the pixel electrode and the common voltage of the common electrode to allow the light transmittance to be adjusted so that gray level is realized.

Further, recently, a fringe field switching (FFS) mode liquid crystal display device having a better viewing angle characteristic than the IPS mode liquid crystal display device has been proposed.

FIG. 1 is a view showing a related art FFS mode liquid crystal display device.

As shown in FIG. 1, an FFS mode liquid crystal display device 100 includes a gate line 143 having a straight line shape in one direction, and a data line 151 having a straight line shape that crosses the gate line 143 to define a pixel region P. A thin film transistor Tr, which is connected to the data line 151 and the gate line 143 and is a switching element including a gate electrode (not shown), a gate insulating layer (not shown), a semiconductor layer (not shown), and source and drain electrodes 155 and 158, are formed in the pixel region P.

Further, a plate-shaped common electrode 160 and a pixel electrode 170, which overlaps the common electrode 160 and has a plurality of bar-shaped openings op, are formed. In this case, the common electrode 160 is formed on an entire surface of a display region. However, a portion of the common electrode 160 corresponding to one pixel region P is indicated by a dotted line. In the FFS mode liquid crystal display device 100 having such a configuration, a voltage is applied to the common electrode 160 and the pixel electrode 170 having the bar-shaped openings op for each pixel region P so that a fringe field is formed.

Meanwhile, recently, research is being actively conducted on a high-speed response of the liquid crystal display device 100 to improve the reality of display. Here, the response speed refers to a time from light gray to dark gray (hereinafter referred to as grey to grey (GTG)). That is, the response speed is a measured value of a time from 10% brightness to 90% brightness. For example, in the case of a virtual reality (VR) device, a high response speed of the liquid crystal display device 100 becomes very important because an image is viewed in a state in which a screen and a person's eyes are close to each other.

However, because the liquid crystal display device 100 uses an electro-optic effect of a liquid crystal, which is fluid, the response speed is limited by the behavior of the liquid crystal. Accordingly, an afterimage in which a screen is blinking is caused. In the related art FFS type liquid crystal display device 100, a characteristic of a viewing angle is improved, but there is a limit to improving the response speed.

SUMMARY

Accordingly, embodiments of the present disclosure are directed to a liquid crystal display device that substantially obviates one or more of the problems due to limitations and disadvantages of the related art.

An aspect of the present disclosure is to provide a liquid crystal display device with high-speed response, improved transmittance, and reduced driving voltage thereof.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a liquid crystal display device comprises a first substrate including a plurality of pixel regions; thin film transistors on the first substrate; a first electrode electrically connected to each of the thin film transistors and in each of the plurality of pixel regions; a passivation layer on the first electrode; a second electrode on the passivation layer and defining an opening in each of the plurality of pixel regions corresponding to the first electrode; a liquid crystal layer on the second electrode; and a second substrate on the liquid crystal layer.

Advantages and features of the disclosure will be set forth in part in the description which follows and in part will become apparent to those having ordinary skill in the art upon examination of the following or may be learned from practice of the disclosure. Other advantages and features of the embodiments herein may be realized and attained by the structure particularly pointed out in the written description and claims hereof as well as the appended drawings.

It is to be understood that both the foregoing general description and the following detailed description are exemplary and explanatory, and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles.

DETAILED DESCRIPTION

Hereinafter, example embodiments of the present disclosure will be described with reference to the accompanying drawings.

First Example Embodiment

Figure 2:
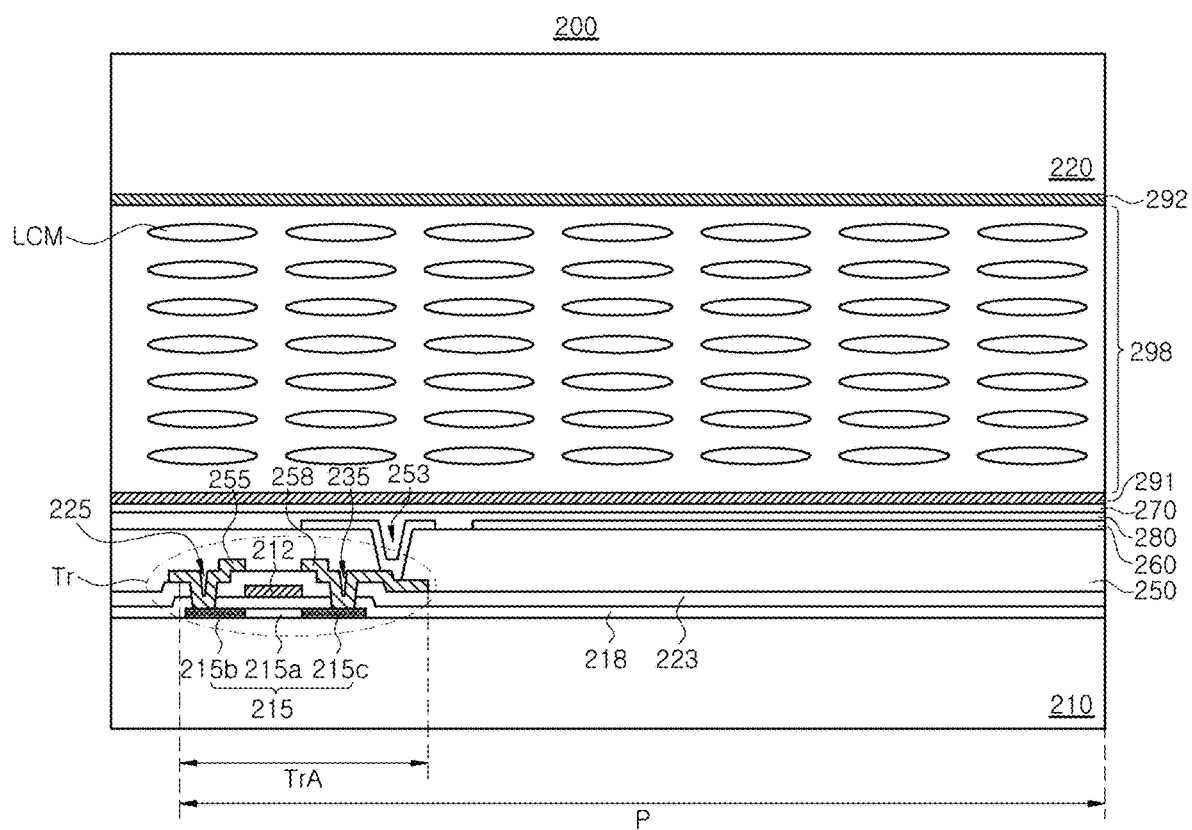
FIG. 2 is a cross-sectional view showing a configuration of a liquid crystal display device to which a first example embodiment of the present disclosure is applied.

FIG. 2 is a cross-sectional view showing a configuration of a liquid crystal display device to which a first example embodiment of the present disclosure is applied.

As shown in FIG. 2, a semiconductor layer 215 may be formed in an element region TrA in which a thin film transistor Tr is formed in each pixel region P on a first substrate 210, a gate insulating layer 218 may be formed on a substantially entire surface of the first substrate 210 over the semiconductor layer 215, and a gate electrode 212 may be formed to correspond to a central portion of the semiconductor layer 215 over the gate insulating layer 218. Further, an interlayer insulating layer 223 including semiconductor contact holes 225 may be formed on the substantially entire surface of the first substrate 210 over the gate electrode 212. The semiconductor contact holes 225 may expose heavily doped source and drain regions 215b and 215c of the semiconductor layer 215, which are exposed to the outside of the gate electrode 212.

An example of a thin film transistor Tr having a coplanar structure has been described above, but embodiments of the present disclosure are not limited thereto. For example, a thin film transistor having a bottom gate structure may be used. Further, source and drain electrodes 255 and 258, which are in contact with the source region 215b and the drain region 215c, respectively, through the semiconductor contact holes 225 and spaced apart from each other, may be formed on the interlayer insulating layer 223.

A first passivation layer 250 having a drain contact hole 253 through which the drain electrode 258 is exposed may be formed on the source and drain electrodes 255 and 258. Here, in the liquid crystal display device 200 according to the first example embodiment of the present disclosure, a plate-shaped first electrode 260 made of a transparent conductive material, such as indium-tin-oxide (ITO) or indium-zinc-oxide (IZO), may be disposed on the first passivation layer 250.

The first electrode 260 may be in contact with the drain electrode 258 through the drain contact hole 253 formed in the first passivation layer 250. That is, the first electrode 260 may be formed for each pixel region P and each first electrode 260 may be electrically connected to each thin film transistor Tr through the drain contact hole 253.

Further, a second passivation layer 280, which is made of an inorganic insulating material, such as silicon oxide ($SiO_2$) or silicon nitride ($SiN_x$), or an organic insulating material, such as benzocyclobutene (BCB) or photo acryl, may be formed on a substantially entire surface of the display region over the first electrode 260. A second electrode 270 made of a transparent conductive material, such as ITO or IZO, may be formed on the substantially entire display region over the second passivation layer 280. Here, the second electrode 270 may include an opening corresponding to the first electrode 260 formed in each pixel region P. The opening formed in the second electrode 270 will be described in more detail below. Meanwhile, a first alignment layer 291 may be formed on the second electrode 270.

As described above, the second passivation layer 280 is formed between the first electrode 260 and the second electrode 270. Thus, the liquid crystal display device 200 may have a structure in which a fringe field is formed when a voltage is applied.

Meanwhile, a black matrix (not shown) for preventing or reducing leakage of light may be formed under a second substrate 220 opposite to the first substrate 210, and a color filter layer (not shown) including red, green, and blue color filter patterns may be formed between adjacent portions of the black matrix. Further, an overcoat layer (not shown) for planarizing a surface of the color filter layer and protecting the color filter layer may be formed under the color filter layer, and a second alignment layer 292 may be formed under the overcoat layer.

The first substrate 210 and the second substrate 220 are attached to each other with a liquid crystal layer 298 made of liquid crystal molecules LCM interposed therebetween so that a fringe field switching (FFS) mode liquid crystal display device 200 is completely formed. Here, in the liquid crystal display device 200 to which the first example embodiment of the present disclosure is applied, the drain electrode 258 and the first electrode 260 are in contact with each other through the drain contact hole 253, but embodiments of the present disclosure are not limited thereto. Alternatively, the drain electrode 258 and the second electrode 270 may be in contact with each other through the drain contact hole 253, the first electrode 260 may be formed on the substantially entire surface of the display region, and the second electrode 270 may be formed for each pixel region P. Further, one of the first electrode 260 and the second electrode 270 may be a pixel electrode, and the other thereof may be a common electrode.

The configuration of the FFS mode liquid crystal display device 200 described above is one example, but embodiments of the present disclosure are not limited thereto.

Figure 3:
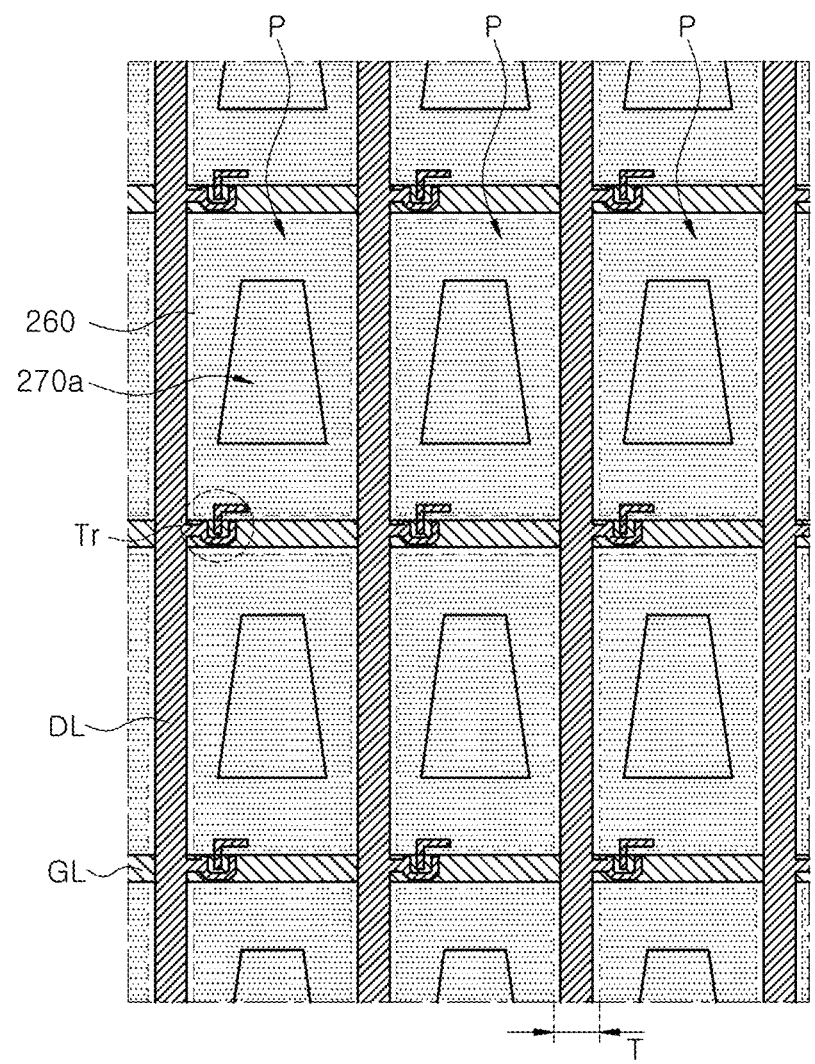
FIG. 3 is a plan view showing an electrode structure of the liquid crystal display device according to the first example embodiment of the present disclosure.

Hereinafter, an example of the case in which the first electrode 260 is a pixel electrode and the second electrode 270 is a common electrode will be described with reference to FIG. 3. FIG. 3 is a plan view showing an electrode structure of the liquid crystal display device according to the first example embodiment of the present disclosure.

As shown in FIG. 3, gate lines GL and data lines DL, which cross each other to define pixel regions P, a thin film transistor Tr, which switches a voltage at an intersection of the gate line GL and the data line DL to be turned on or off, a plate-shaped pixel electrode 260 disposed in each of the pixel regions P, and the common electrode 270 of FIG. 2 having an opening 270a are formed. Here, the common electrode 270 of FIG. 2 is formed on a substantially entire surface of a display region, the opening 270a of the common electrode 270 of FIG. 2 is indicated by a solid line, and the pixel electrode 260 formed in each the pixel region P is indicated by a dotted line. Further, the pixel electrode 260 is connected to the thin film transistor Tr through the drain contact hole 253 of FIG. 2.

In the drawing, although the thin film transistor Tr is shown as having a U-shaped channel as an example, a channel type of the thin film transistor Tr may be variously modified according to structures of the source and drain electrodes 255 and 258 of FIG. 2. Further, the gate electrode 212 of FIG. 2 of the thin film transistor Tr is shown as being formed as a portion of the gate line GL itself. However, the gate electrode 212 of FIG. 2 may be formed by being branched into the pixel region P from the gate line GL.

Here, in the liquid crystal display device 200 of FIG. 2 according to the first example embodiment of the present disclosure, the opening 270a of the common electrode 270 of FIG. 2 may be formed to correspond to the pixel electrode 260 formed in each pixel region P. Thus, the common electrode 270 of FIG. 2 may have one opening 270a for each pixel region P. Further, the opening 270a may have a trapezoidal shape, but embodiments of the present disclosure are not limited thereto, and the opening 270a may have a polygonal shape that is bilaterally symmetrical.

Figure 4A:
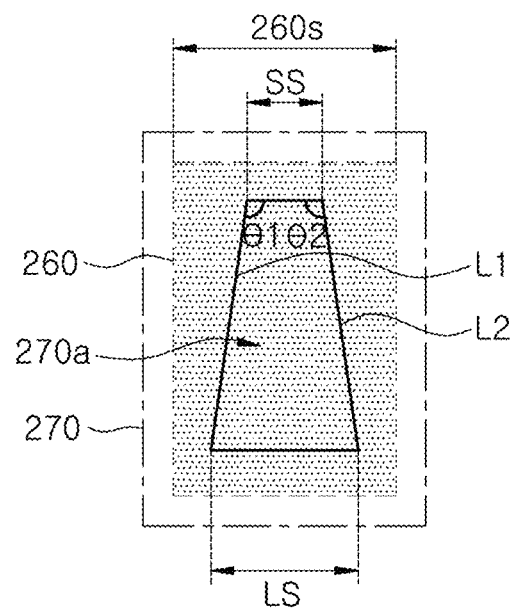
FIG. 4A is a plan view showing an electrode structure for one pixel region of the liquid crystal display device according to the first example embodiment of the present disclosure.
Figure 4B:
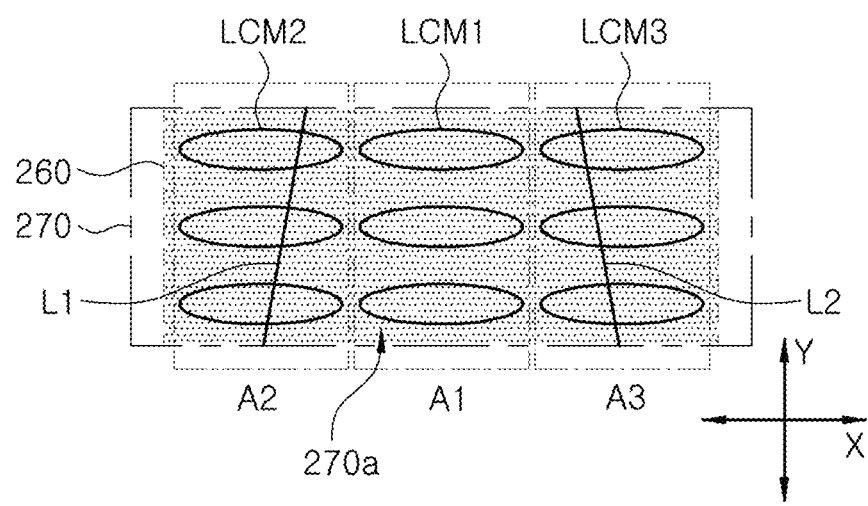
FIG. 4B is a view showing an initial alignment state of liquid crystal molecules of the liquid crystal display device according to the first example embodiment of the present disclosure.
Figures 4C, 5:
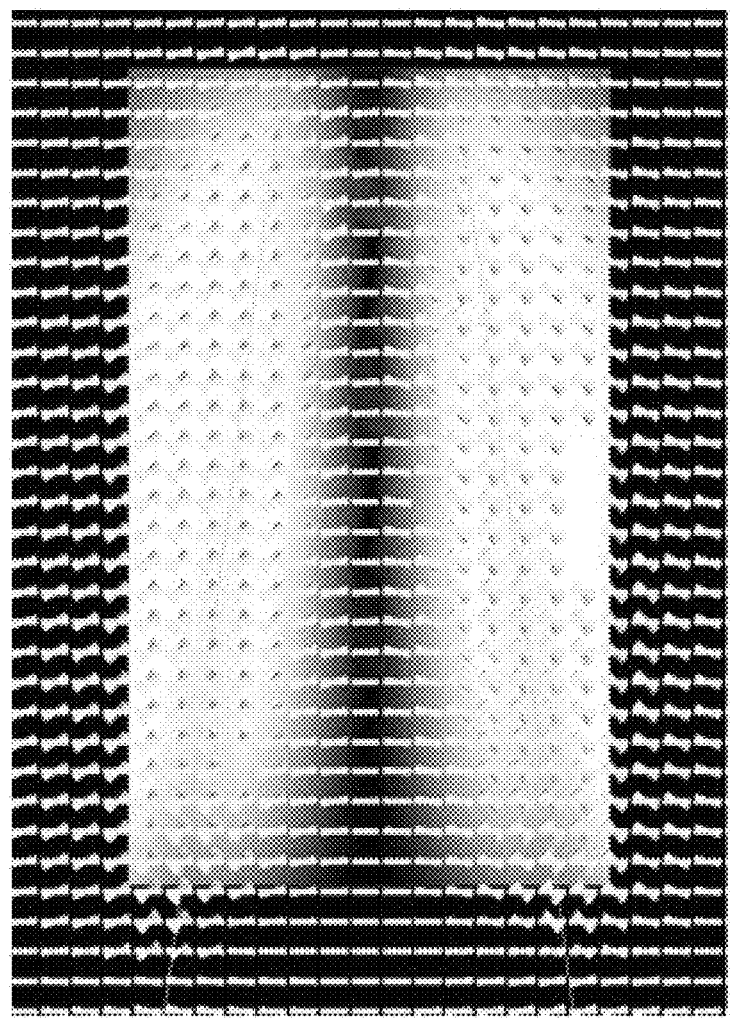
FIG. 4C is a view showing operation states of the liquid crystal molecules of the first example embodiment of the present disclosure.
FIG. 5 is a comparison table comparing a response speed of the liquid crystal display device according to the first example embodiment of the present disclosure and that of the related art liquid crystal display device.

FIG. 4A is a plan view showing an electrode structure for one pixel region of the liquid crystal display device according to the first example embodiment of the present disclosure, FIG. 4B is a view showing an initial alignment state of liquid crystal molecules of the liquid crystal display device according to the first example embodiment of the present disclosure, and FIG. 4C is a view showing operation states of the liquid crystal molecules of the first example embodiment of the present disclosure.

As shown in FIG. 4A, the common electrode 270 is disposed over the pixel electrode 260, and the common electrode 270 has an opening 270a having a trapezoidal shape. Here, the common electrode 270 corresponding to one pixel region P is indicated by a dot-dash line, the opening 270a of the common electrode 270 is indicated by a solid line, and the pixel electrode 260 is indicated by a dotted line. The opening 270a having the trapezoidal shape may include a short side SS and a long side LS, which are parallel to the gate line GL of FIG. 3. Further, the opening 270a may further include first and second sides L1 and L2 that connect the short side SS to the long side LS. In this case, the opening 270a having the trapezoidal shape may be bilaterally symmetrical.

Here, a length of the short side SS of the opening 270a may be in a range of 0.15 times to 0.3 times a width 260s of the pixel electrode 260 formed in one pixel region P, but embodiments of the present disclosure are not limited thereto. The width 260s of the pixel electrode 260 may refer to a width of the pixel electrode 260 in a short axis parallel to the gate line GL of FIG. 3. Further, a length of the long side LS of the opening 270a may be in a range of 0.7 times to 0.8 times the width 260s of the pixel electrode 260, but embodiments of the present disclosure are not limited thereto.

The short side SS and the first side L1 or the second side L2 of the opening 270a having the trapezoidal shape may have one of first and second obtuse angles $\theta 1$ and $\theta 2$ that are equal to each other. The first and second obtuse angles $\theta 1$ and $\theta 2$ each may range from 91° to 130°, but embodiments of the present disclosure are not limited thereto. Here, the width 260s of the pixel electrode 260 may range from 5 μm to 6 μm, but embodiments of the present disclosure are not limited thereto.

The sizes and widths of the pixel electrode 260 and the opening 270a of the common electrode 270 and a connection relationship therebetween may vary according to a type and size of an electronic product.

Further, a distance T of FIG. 3 between adjacent pixel electrodes 260 in an extending direction of the gate line GL of FIG. 3 may range from 2 μm to 4 μm, but embodiments of the present disclosure are not limited thereto.

The desired gray level may be expressed by the minute rotation of the liquid crystal molecules LCM of FIG. 2 through the pixel electrode 260 and the opening 270a of the common electrode 270 disposed over the pixel electrode 260. That is, a rising time of the liquid crystal may be reduced.

In FIG. 4B, the initial alignment state of the liquid crystal molecules of the liquid crystal display device according to the first example embodiment is shown.

Here, first liquid crystal molecules LCM1 are arranged in a first region A1, which is a region of the opening 270a of the common electrode 270, and second and third liquid crystal molecules LCM2 and LCM3 are arranged in second and third regions A2 and A3, which are regions of the first and second sides L1 and L2 of the opening 270a of the common electrode 270, respectively. Thus, the first liquid crystal molecules LCM1 may be liquid crystal molecules arranged in a region in which the common electrode 270 and the pixel electrode 260 do not overlap.

The first to third liquid crystal molecules LCM1, LCM2, and LCM3 may be positive liquid crystal molecules of which a dielectric anisotropy (Δε) is positive (+). In this case, an initial alignment direction may be a direction parallel to a second axis Y. Alternatively, the first to third liquid crystal molecules LCM1, LCM2, and LCM3 may be negative liquid crystal molecules of which a dielectric anisotropy (Δε) is negative (−). In this case, an initial alignment direction may be a direction parallel to a first axis X perpendicular to the second axis Y.

Hereinafter, an example of the case in which the first to third liquid crystal molecules LCM1, LCM2, and LCM3 are negative liquid crystal molecules of which a dielectric anisotropy (Δε) is negative (−) will be described.

The first alignment layer 291 of FIG. 2 of the first substrate 210 of FIG. 2 and the second alignment layer 292 of FIG. 2 of the second substrate 220 of FIG. 2 may have the same alignment direction. Here, initial alignment directions of the first to third liquid crystal molecules LCM1, LCM2, and LCM3 may be the same direction as the first axis X.

In FIG. 4C, operation states of the liquid crystal molecules LCM1, LCM2, and LCM3 in the case in which a voltage is applied to the pixel electrode 260 of FIG. 2 and the common electrode 270 of FIG. 2 are shown. Here, with additional reference to FIG. 4B, when a voltage is applied to the pixel electrode 260 of FIG. 2 and the common electrode 270 of FIG. 2, the alignment directions of the liquid crystal molecules LCM1, LCM2, and LCM3 are changed by an electric field formed between the pixel electrode 260 of FIG. 2 and the common electrode 270 of FIG. 2. The negative liquid crystal molecules LCM1, LCM2, and LCM3 of which a dielectric anisotropy (Δε) is negative (−) are arranged such that long axes of liquid crystal molecules LCM1, LCM2, and LCM3 are in parallel in a direction perpendicular to a direction in which the electric field is applied.

In this case, the first liquid crystal molecules LCM1, which are arranged in the first region A1 that is the region of the opening 270a of the common electrode 270, are not rotated due to the equilibrium of electric fields in different directions. Thus, the long axes of the second and third liquid crystal molecules LCM2 and LCM3 arranged in the second region A2 and the third region A3 may be rotated in a direction perpendicular to the direction in which the electric field is applied, but the first liquid crystal molecules LCM1 arranged in the first region A1 are not rotated. For example, the second and third regions A2 and A3, which are rotation regions, may be positioned symmetrically to each other with respect to the first region A1, which is a fixed region.

Accordingly, only the second and third liquid crystal molecules LCM2 and LCM3 arranged in the second and third regions A2 and A3, which are symmetrical to each other with respect to the first liquid crystal molecules LCM1 arranged in the first region A1, are rotated when the voltage is applied. Therefore, when the applied voltage is removed, a restoring force, in which the second and third liquid crystal molecules LCM2 and LCM3 arranged in the second and third regions A2 and A3 return to the initial alignment state due to the first liquid crystal molecules LCM1 arranged in the first region A1, can be improved, and thus a falling time may be shortened.

Furthermore, the second and third liquid crystal molecules LCM2 and LCM3 arranged in the second and third regions A2 and A3 of the first example embodiment of the present disclosure have the same rotation direction. Therefore, a disclination line, which is generated at a boundary between the liquid crystal molecules LCM when the rotation directions of the liquid crystal molecules LCM are different, may be reduced, and transmittance can be effectively improved.

FIG. 5 is a comparison table comparing a response speed of the liquid crystal display device according to the first example embodiment of the present disclosure and that of a related art liquid crystal display device.

Here, a response speed of a liquid crystal display device in a normally black mode is determined by a rising time (Ton), which is a time for which transmittance is changed from 10% to 90% by changing an alignment of liquid crystal molecules when a potential difference is applied to a liquid crystal cell, and a falling time (Toff), which is a time for which transmittance is changed from 90% to 10% by changing the alignment of the liquid crystal molecules when the potential difference is removed.

Figure 1:
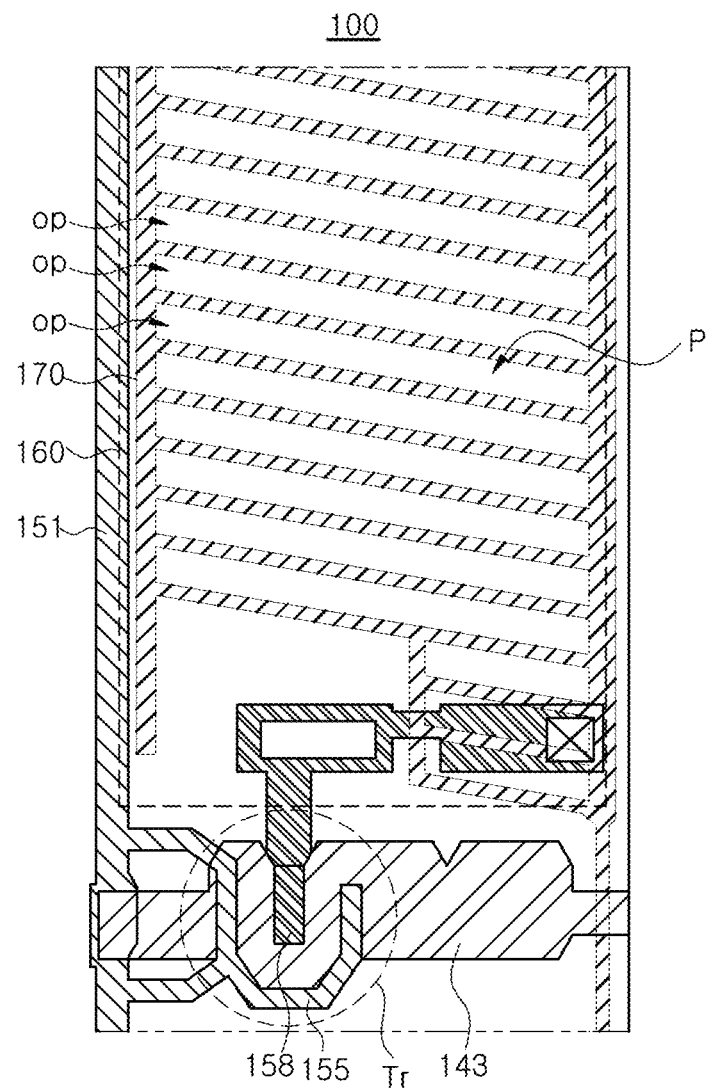
FIG. 1 is a view showing a related art fringe field switching mode liquid crystal display device.

As shown in FIG. 5, a rising time of the liquid crystal display device 200 of FIG. 2 according to the first example embodiment of the present disclosure is 6.5 ms, which is 44% of 14.7 ms, which is a rising time of the related art liquid crystal display device 100 of FIG. 1. Thus, it can be seen that the rising time of the liquid crystal display device 200 of FIG. 2 according to the first example embodiment of the present disclosure is improved by 56% in comparison with that of the related art liquid crystal display device 100 of FIG. 1.

Further, a falling time of the liquid crystal display device 200 of FIG. 2 according to the first example embodiment of the present disclosure is 5.2 ms, which is 46.5% of 12.5 ms, which is a falling time of the related art liquid crystal display device 100 of FIG. 1. Thus, it can be seen that the falling time of the liquid crystal display device 200 of FIG. 2 according to the first example embodiment of the present disclosure is improved by 58% in comparison with that of the related art liquid crystal display device 100 of FIG. 1.

As described above, in the liquid crystal display device 200 according to the first example embodiment of the present disclosure, the desired gray level may be expressed by the minute rotation of the liquid crystal molecules LCM through the pixel electrode 260 and the opening 270a of the common electrode 270 disposed over the pixel electrode 260. That is, the rising time of the liquid crystal may be reduced.

Further, only the second and third liquid crystal molecules LCM2 and LCM3 arranged in the second and third regions A2 and A3, which are symmetrical to each other with respect to the first liquid crystal molecules LCM1 arranged in the first region A1, are rotated when the voltage is applied. Therefore, when the applied voltage is removed, the restoring force, in which the second and third liquid crystal molecules LCM2 and LCM3 arranged in the second and third regions A2 and A3 return to the initial alignment state due to the first liquid crystal molecules LCM1 arranged in the first region A1, can be improved, and thus the falling time may be shortened.

As described above, in the liquid crystal display device 200 according to the first example embodiment of the present disclosure, a response speed can be more effectively improved than that of the related art FFS mode liquid crystal display device 100 of FIG. 1 so that a display device capable of high-speed response may be realized. For example, in a device such as a virtual reality (VR) device, an afterimage can be effectively improved and the quality of an image can be improved.

Second Example Embodiment

A second example embodiment of the present disclosure is directed to a liquid crystal display device capable of implementing a high response speed, further improving transmittance than that of the first example embodiment, and reducing a driving voltage. Hereinafter, the second example embodiment of the present disclosure will be described with reference to the accompanying drawings. A detailed description of aspects that is similar to or those same as that in the first example embodiment may be omitted.

Figure 6:
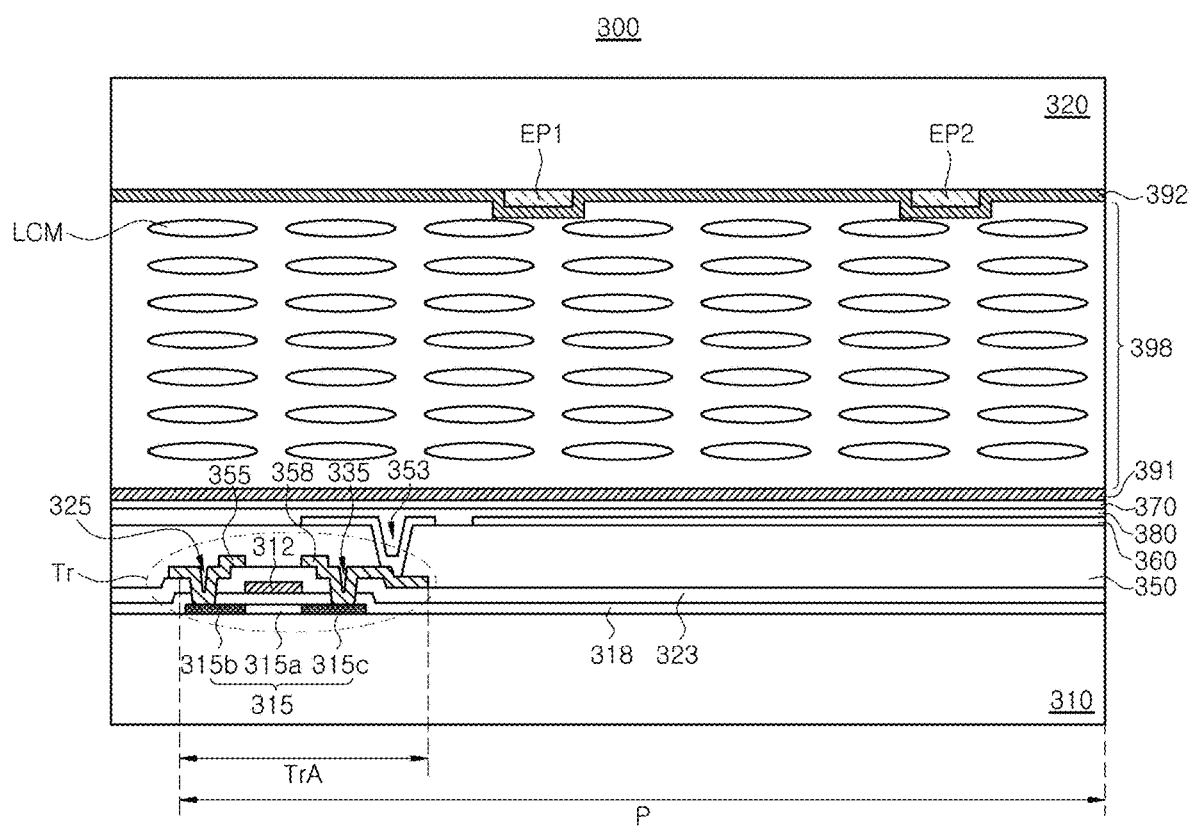
FIG. 6 is a cross-sectional view showing a configuration of a liquid crystal display device to which a second example embodiment of the present disclosure is applied.

FIG. 6 is a cross-sectional view showing a configuration of the liquid crystal display device to which the second example embodiment of the present disclosure is applied. As shown in FIG. 6, a semiconductor layer 315 may be formed in an element region TrA in which a thin film transistor Tr is formed in each pixel region P on a first substrate 310, a gate insulating layer 318 may be formed on a substantially entire surface of the first substrate 310 over the semiconductor layer 315, and a gate electrode 312 may be formed to correspond to a central portion of the semiconductor layer 315 over the gate insulating layer 318.

An interlayer insulating layer 323 including semiconductor contact holes 325 may be formed on the substantially entire surface of the first substrate 310 over the gate electrode 312. The semiconductor contact holes 325 may expose heavily doped source and drain regions 315b and 315c of the semiconductor layer 315, which are exposed to the outside of the gate electrode 312.

An example of thin film transistor Tr having a coplanar structure has been described above, but embodiments of the present disclosure are not limited thereto. For example, a thin film transistor having a bottom gate structure may be used.

Further, source and drain electrodes 355 and 358, which are in contact with the source region 315b and the drain region 315c, respectively, through the semiconductor contact holes 325 and spaced apart from each other, may be formed on the interlayer insulating layer 323. Further, a first passivation layer 350 having a drain contact hole 353 through which a drain electrode 358 is exposed may be formed on the source and drain electrodes 355 and 358.

Here, in the liquid crystal display device 300 according to the second example embodiment of the present disclosure, a plate-shaped first electrode 360 made of a transparent conductive material, such as ITO or IZO, may be disposed on the first passivation layer 350. Additionally, the first electrode 360 may be in contact with the drain electrode 358 through the drain contact hole 353 formed in the first passivation layer 350. Thus, the first electrode 360 may be formed for each pixel region P and each first electrode 360 may be electrically connected to each thin film transistor Tr through the drain contact hole 353. A second passivation layer 380, which is made of an inorganic insulating material, such as silicon oxide ($SiO_2$) or silicon nitride ($SiN_x$), or an organic insulating material, such as BCB or photo acryl, may be formed on a substantially entire surface of the display region over the first electrode 360.

Further, a second electrode 370 made of a transparent conductive material, such as ITO or IZO, may be formed on the substantially entire display region over the second passivation layer 380. Here, the second electrode 370 may include an opening corresponding to the first electrode 360 formed in each pixel region P. The opening formed in the second electrode 370 will be described in more detail below. Additionally, a first alignment layer 391 may be formed on the second electrode 370.

As described above, the second passivation layer 380 may be formed between the first electrode 360 and the second electrode 370, and thus the liquid crystal display device 300 may have a structure in which a fringe field is formed when a voltage is applied.

Meanwhile, a black matrix (not shown) for preventing leakage of light may be formed under a second substrate 320 opposite to the first substrate 310, and a color filter layer (not shown) including red, green, and blue color filter patterns may be formed between adjacent portions of the black matrix. Further, an overcoat layer (not shown) for planarizing a surface of the color filter layer and protecting the color filter layer may be formed under the color filter layer and a second alignment layer 392 may be formed under the overcoat layer.

In the liquid crystal display device 300 according to the second example embodiment of the present disclosure, electrode patterns EP1 and EP2 may be formed between the second alignment layer 392 and the second substrate 320. Here, the electrode patterns EP1 and EP2 may be disposed to correspond to the opening formed in the second electrode 370. For example, the electrode patterns EP1 and EP2 may be disposed to correspond to at least one side of the opening formed in the second electrode 370. Further, each of the electrode patterns EP1 and EP2 may have a bar shape. The electrode patterns EP1 and EP2 may have different lengths, but embodiments of the present disclosure are not limited thereto. The electrode patterns EP1 and EP2 may have the same length.

Here, the electrode patterns EP1 and EP2 may be formed of a transparent conductive material, such as ITO or IZO, but embodiments of the present disclosure are not limited thereto. Further, each of the electrode patterns EP1 and EP2 may be connected to a common voltage terminal, but embodiments of the present disclosure are not limited thereto. The electrode patterns EP1 and EP2 will be described in more detail below.

The first substrate 310 and the second substrate 320 are attached to each other with a liquid crystal layer 398 made of liquid crystal molecules LCM interposed therebetween to complete a FFS mode liquid crystal display device 300. Here, in the liquid crystal display device 300 to which the second example embodiment of the present disclosure is applied, the drain electrode 358 and the first electrode 360 are in contact with each other through the drain contact hole 353. In another example embodiment, the drain electrode 358 and the second electrode 370 may be in contact with each other through the drain contact hole 353, the first electrode 360 may be formed on a substantially entire surface of a display region, and the second electrode 370 may be formed for each pixel region P. Further, one of the first electrode 360 and the second electrode 370 may be a pixel electrode, and the other may be a common electrode.

The configuration of the FFS mode liquid crystal display device 300 described above is one example, but embodiments of the present disclosure are not limited thereto.

Figure 7:
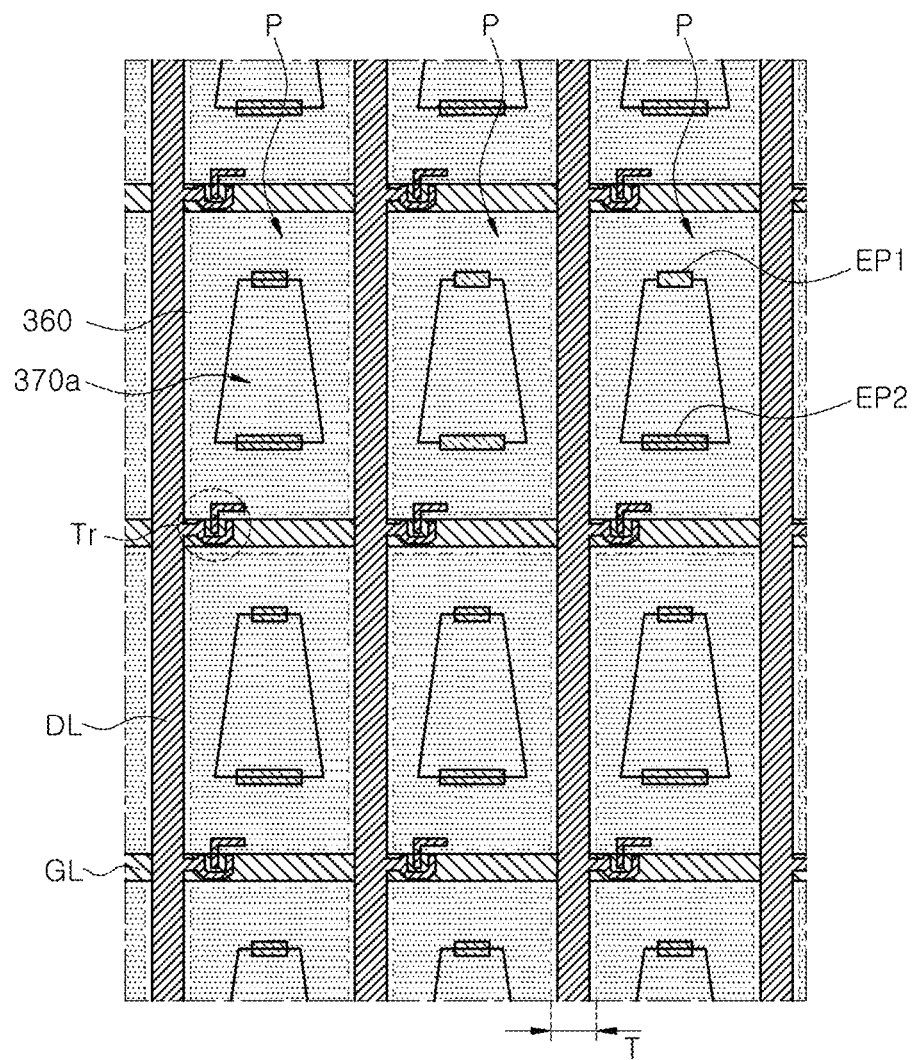
FIG. 7 is a plan view showing an electrode structure of the liquid crystal display device according to the second example embodiment of the present disclosure.

Hereinafter, an example of the case in which the first electrode 360 is a pixel electrode and the second electrode 370 is a common electrode will be described with reference to FIG. 7. FIG. 7 is a plan view showing an electrode structure of the liquid crystal display device according to the second example embodiment of the present disclosure.

As shown in FIG. 7, gate lines GL and data lines DL, which cross each other to define pixel regions P, a thin film transistor Tr, which switches on and off of a voltage at an intersection of the gate line GL and the data line DL, a plate-shaped pixel electrode 360 disposed in each of the pixel regions P, the common electrode 370 of FIG. 6 having an opening 370a, and electrode patterns EP1 and EP2 are formed. Here, the common electrode 370 of FIG. 6 is formed on the substantially entire surface of the display region, the opening 370a of the common electrode 370 of FIG. 6 is indicated by a solid line, and the pixel electrode 360 formed in each the pixel region P is indicated by a dotted line.

Further, the first electrode pattern EP1 and the second electrode pattern EP2 are shown as being formed in each of the pixel regions P, but this is only an example. Alternatively, only one of the first electrode pattern EP1 and the second electrode pattern EP2 may be formed in each pixel region P, or an electrode pattern in addition to the first electrode pattern EP1 and the second electrode pattern EP2 may be further formed.

In addition, the first electrode pattern EP1 and the second electrode pattern EP2 formed in each of the pixel regions P are shown as having different lengths, but this is only an example. Alternatively, the first electrode pattern EP1 and the second electrode pattern EP2 may have the same length.

Further, the pixel electrode 360 and the common electrode 370 of FIG. 6 may be formed on the first substrate 310 of FIG. 6, the first electrode pattern EP1 and the second electrode pattern EP2 may be formed on an inner surface of the second substrate 320 of FIG. 6, and the first substrate 310 of FIG. 6 and the second substrate 320 of FIG. 6 may be opposite to each other with the liquid crystal layer 398 of FIG. 6 interposed therebetween. For example, the pixel electrode 360 and the common electrode 370 of FIG. 6 may be formed between the liquid crystal layer 398 of FIG. 6 and the first substrate 310 of FIG. 6, and the electrode patterns EP1 and EP2 may be formed between the liquid crystal layer 398 of FIG. 6 and the second substrate 320 of FIG. 6. Further, the pixel electrode 360 may be connected to the thin film transistor Tr through the drain contact hole 353 of FIG. 6.

In FIGS. 6 and 7, although the thin film transistor Tr is shown as having a U-shaped channel as an example, a channel type of the thin film transistor Tr may be variously modified according to structures of the source and drain electrodes 355 and 358 of FIG. 6.

The gate electrode 312 of FIG. 6 of the thin film transistor Tr is shown as being formed as a portion of the gate line GL itself. However, the gate electrode 312 of FIG. 6 may be formed by being branched into the pixel region P from the gate line GL.

Here, in the liquid crystal display device 300 of FIG. 6 according to the second example embodiment of the present disclosure, the opening 370a of the common electrode 370 of FIG. 6 may be formed to correspond to the pixel electrode 360 formed in each pixel region P. For example, the common electrode 370 of FIG. 6 may have one opening 370a for each pixel region P. The opening 370a may have a trapezoidal shape, but embodiments of the present disclosure are not limited thereto, and the opening 370a may have a polygonal shape that is bilaterally symmetrical.

Figure 8A:
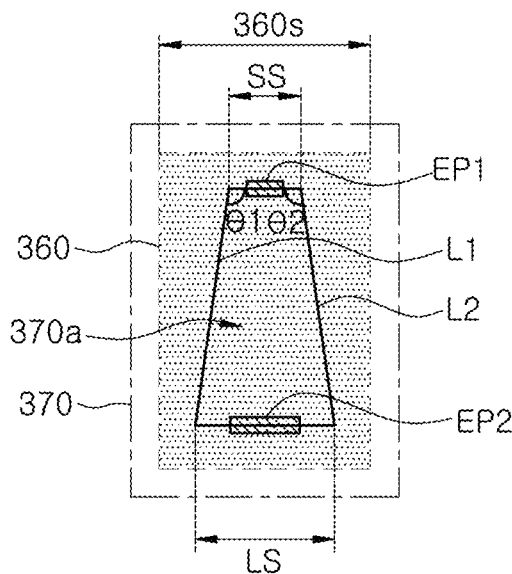
FIG. 8A is a plan view showing an electrode structure for one pixel region of the liquid crystal display device according to the second example embodiment of the present disclosure.
Figure 8B:
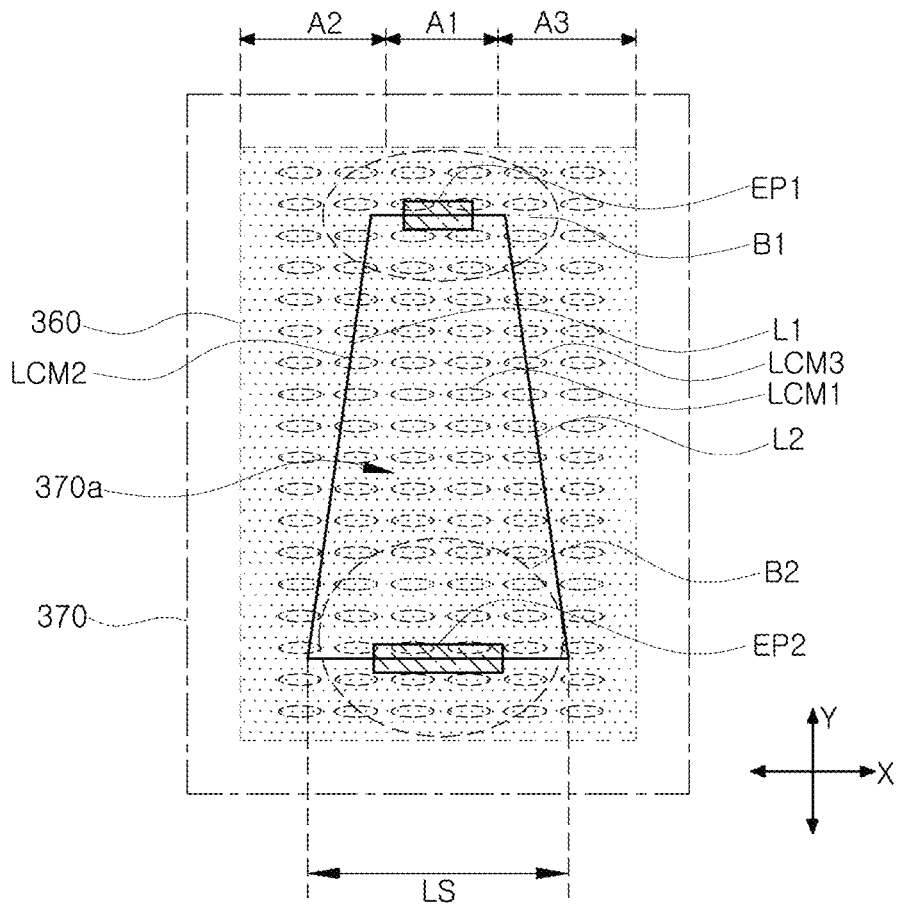
FIG. 8B is a view showing an initial alignment state of liquid crystal molecules of the liquid crystal display device according to the second example embodiment of the present disclosure.
Figure 8C:
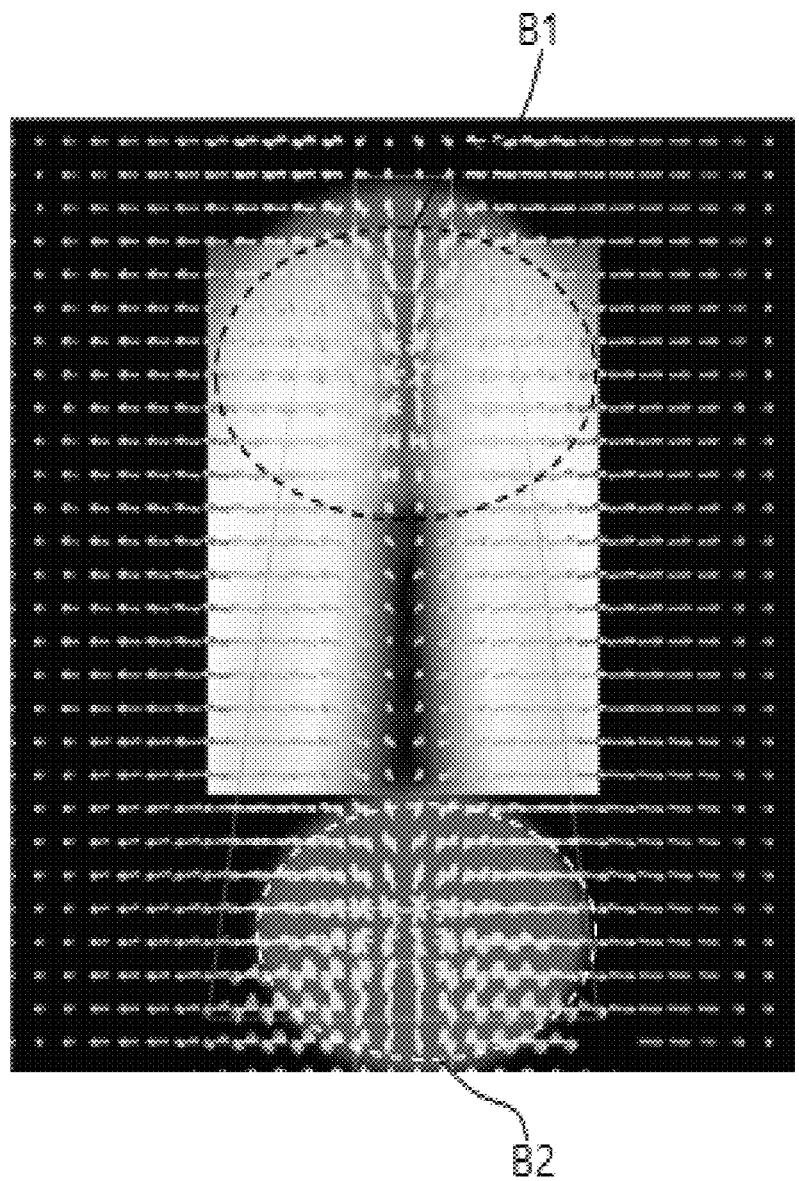
FIG. 8C is a view showing operation states of the liquid crystal molecules of the second example embodiment of the present disclosure.

FIG. 8A is a plan view showing an electrode structure for one pixel region of the liquid crystal display device according to the second example embodiment of the present disclosure, FIG. 8B is a view showing an initial alignment state of liquid crystal molecules of the liquid crystal display device according to the second example embodiment of the present disclosure, and FIG. 8C is a view showing operation states of the liquid crystal molecules of the second example embodiment of the present disclosure.

As shown in FIG. 8A, the common electrode 370 is disposed over the pixel electrode 360. The common electrode 370 may include an opening 370a having a trapezoidal shape. The first and second electrode patterns EP1 and EP2 may be disposed on the common electrode 370. Here, the common electrode 370 corresponding to one pixel region P of FIG. 7 is indicated by a dot-dash line, the opening 370a of the common electrode 370 is indicated by a solid line, and the pixel electrode 360 is indicated by a dotted line. Moreover, the opening 370a having the trapezoidal shape may include a short side SS and a long side LS, which are parallel to the gate line GL of FIG. 7.

The opening 370a may further include first and second sides L1 and L2 that connect the short side SS to the long side LS. In this case, the opening 370a having the trapezoidal shape may be bilaterally symmetrical. Here, a length of the short side SS of the opening 370a may be in a range of 0.15 times to 0.3 times a width 360s of the pixel electrode 360 formed in one pixel region P of FIG. 7, but embodiments of the present disclosure are not limited thereto.

Here, the width 360s of the pixel electrode 360 refers to a width of the pixel electrode 360 in a short axis parallel to the gate line GL of FIG. 7. Further, a length of the long side LS of the opening 370a may be in a range of 0.7 times to 0.8 times the width 360s of the pixel electrode 360, but embodiments of the present disclosure are not limited thereto. Moreover, the short side SS and the first side L1 or the second side L2 of the opening 370a having the trapezoidal shape may have one of first and second obtuse angles θ1 and θ2, which are equal to each other. The first and second obtuse angles θ1 and θ2 each may range from 91° to 130°, but embodiments of the present disclosure are not limited thereto. In addition, the width 360s of the pixel electrode 360 may range from 5 μm to 6 μm, but embodiments of the present disclosure are not limited thereto. The sizes and widths of the pixel electrode 360 and the opening 370a of the common electrode 370 and a connection relationship therebetween may vary according to a type and size of an electronic product.

Further, a distance T of FIG. 7 between adjacent pixel electrodes 360 in an extending direction of the gate line GL of FIG. 7 may range from 2 μm to 4 μm, but embodiments of the present disclosure are not limited thereto. Particularly, the electrode patterns EP1 and EP2 corresponding to the opening 370a of the common electrode 370 may be formed on the inner surface of the second substrate 320 of FIG. 6 of the liquid crystal display device 300 of FIG. 6 according to the second example embodiment of the present disclosure. For example, the first electrode pattern EP1, which is disposed to correspond to the short side SS of the opening 370a of the common electrode 370, and the second electrode pattern EP2, which is disposed to correspond to the long side LS, may be provided.

However, this is one example embodiment, and the electrode patterns EP1 and EP2 may be disposed to correspond to at least one of the long side LS and the short side SS. For example, only the second electrode pattern EP2 corresponding to the long side LS of the opening 370a of the common electrode 370 may be disposed, or only the first electrode pattern EP1 corresponding to the short side SS of the opening 370a of the common electrode 370 may be disposed.

The first and second electrode patterns EP1 and EP2 may have a bar shape, and the first and second electrode patterns EP1 and EP2 may be disposed to have different lengths. That is, a length of the second electrode pattern EP2 corresponding to the long side LS may be greater than a length of the first electrode pattern EP1 corresponding to the short side SS. However, but embodiments of the present disclosure are not limited thereto, and the first and second electrode patterns EP1 and EP2 may have the same length. Further, the length of the first electrode pattern EP1 may be smaller than or equal to the length of the short side SS of the opening 370a, and the length of the second electrode pattern EP2 may be smaller than or equal to the length of the long side LS of the opening 370a, but embodiments of the present disclosure are not limited thereto.

The desired gray level may be expressed by the minute rotation of the liquid crystal molecules LCM of FIG. 6 through the pixel electrode 360 and the opening 370a of the common electrode 370 disposed over the pixel electrode 360, and thus a rising time of the liquid crystal may be reduced.

Furthermore, the electrode patterns EP1 and EP2 may be disposed on the inner surface of the second substrate 320 of FIG. 6 to modify a fringe field formed by the pixel electrode 360 and the common electrode 370 in the X-axis and Y-axis directions, and rotation angles of the liquid crystal molecules LCM of FIG. 6 that are arranged to correspond to the opening 370a of the common electrode 370 may be increased, and thus transmittance can be improved.

Further, the electrode patterns EP1 and EP2 may be disposed on the inner surface of the second substrate 320 of FIG. 6, and thus a driving voltage required for rotation of the liquid crystal molecules LCM of FIG. 6 for transmission of light may be lowered.

In FIG. 8B, the initial alignment state of the liquid crystal molecules LCM of FIG. 6 of the liquid crystal display device 300 of FIG. 6 according to the second example embodiment is shown. Here, first liquid crystal molecules LCM1 are arranged in a first region A1 that is a region of the opening 370a of the common electrode 370, and second and third liquid crystal molecules LCM2 and LCM3 are arranged in second and third regions A2 and A3 that are regions of the first and second sides L1 and L2 of the opening 370a of the common electrode 370 and are overlapping regions of the common electrode 370 and the pixel electrode 360, respectively. For example, the first liquid crystal molecules LCM1 may be liquid crystal molecules arranged in a region in which the common electrode 370 and the pixel electrode 360 do not overlap.

Further, a region adjacent to the first electrode pattern EP1 which is disposed to correspond to the short side SS of the opening 370a of the common electrode 370 among the first, second, and third regions A1, A2, and A3 is defined as a first electrode pattern region B1, and a region adjacent to the second electrode pattern EP2 which is disposed to correspond to the long side LS of the opening 370a of the common electrode 370 among the first, second, and third regions A1, A2, and A3 is defined as a second electrode pattern region B2.

Here, the first to third liquid crystal molecules LCM1, LCM2, and LCM3 may be positive liquid crystal molecules of which a dielectric anisotropy ($\Delta\varepsilon$) is positive (+). In this case, an initial alignment direction may be a direction parallel to a second axis Y.

Alternatively, the first to third liquid crystal molecules LCM1, LCM2, and LCM3 may be negative liquid crystal molecules of which a dielectric anisotropy ($\Delta\varepsilon$) is negative (−). In this case, an initial alignment direction may be a direction parallel to a first axis X perpendicular to the second axis Y.

Hereinafter, an example of the case in which the first to third liquid crystal molecules LCM1, LCM2, and LCM3 are negative liquid crystal molecules of which a dielectric anisotropy ($\Delta\varepsilon$) is negative (−) will be described.

Here, the first alignment layer 391 of FIG. 6 of the first substrate 310 of FIG. 6 and the second alignment layer 392 of FIG. 6 of the second substrate 320 of FIG. 6 may have the same alignment direction. For example, initial alignment directions of the first to third liquid crystal molecules LCM1, LCM2, and LCM3 are the same direction as the first axis X.

In FIG. 8C, operation states of the liquid crystal molecules LCM1, LCM2, and LCM3 when a voltage is applied to the pixel electrode 360 of FIG. 6, the common electrode 370 of FIG. 6, and the first and second electrode patterns EP1 and EP2 are shown. Here, with additional reference to FIG. 8B, when a voltage is applied to the pixel electrode 360, the common electrode 370, and the first and second electrode patterns EP1 and EP2, the alignment directions of the liquid crystal molecules LCM1, LCM2, and LCM3 are changed by electric fields formed between the pixel electrode 360, the common electrode 370, and the first and second electrode patterns EP1 and EP2.

The negative liquid crystal molecules LCM1, LCM2, and LCM3 of which a dielectric anisotropy ($\Delta\varepsilon$) is negative (−) are arranged such that long axes of liquid crystal molecules LCM1, LCM2, and LCM3 are in parallel in a direction perpendicular to a direction in which the electric field is applied.

Here, the second and third regions A2 and A3 may be positioned symmetrically to each other with respect to the first region A1.

Accordingly, a restoring force, in which the second and third liquid crystal molecules LCM2 and LCM3 that are disposed to correspond to the second and third regions A2 and A3 return to the initial alignment state due to the first liquid crystal molecules LCM1 that are disposed to correspond to the first region A1, can be improved, and thus a falling time may be shortened.

For example, in the liquid crystal display device 300 of FIG. 6 of the second example embodiment of the present disclosure, the electrode patterns EP1 and EP2 are formed on the inner surface of the second substrate 320 of FIG. 6 to deform the fringe field formed by the pixel electrode 360 and the common electrode 370 in the X-axis and Y-axis directions. Accordingly, the rotation angles of the liquid crystal molecules LCM1, LCM2, and LCM3, which are arranged in the first electrode pattern region B1 and the second electrode pattern region B2, may be increased, and thus the transmittance can be effectively improved in comparison with in the liquid crystal display device 200 of FIG. 2 of the first example embodiment.

Figure 9:
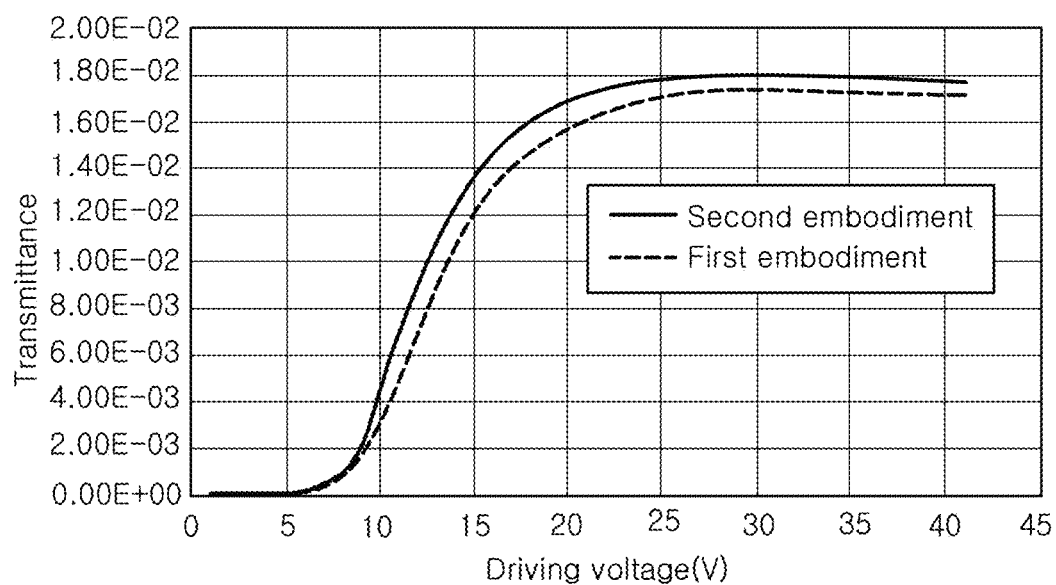
FIG. 9 is a graph comparing transmittances according to driving voltages of the first example embodiment and second example embodiment.

FIG. 9 is a graph comparing transmittances according to driving voltages of the first example embodiment and second example embodiment.

As shown in FIG. 9, it can be seen that in the liquid crystal display device 300 of FIG. 6 according to the second example embodiment of the present disclosure, the transmittance is increased and the driving voltage is reduced in comparison with in the liquid crystal display device 200 of FIG. 2 according to the first example embodiment.

That is, in the liquid crystal display device 300 of FIG. 6 of the second example embodiment, the electrode patterns EP1 and EP2 are formed on the inner surface of the second substrate 320 of FIG. 6 to deform the fringe field formed by the pixel electrode 360 and the common electrode 370 in the X-axis and Y-axis directions, and the rotation angles of the liquid crystal molecules LCM1, LCM2, and LCM3 that are disposed in the first electrode pattern region B1 and the second electrode pattern region B2 are increased. Therefore, in the liquid crystal display device 300 of FIG. 6 of the second example embodiment, the transmittance can be improved and a driving voltage required for rotation of the liquid crystal molecules LCM of FIG. 6 for transmission of light may be reduced in comparison with in the liquid crystal display device 200 of FIG. 2 of the first example embodiment.

As described above, in the liquid crystal display device 300 according to the second example embodiment of the present disclosure, the desired gray level may be expressed by the minute rotation of the liquid crystal molecules LCM through the pixel electrode 360 and the opening 370a of the common electrode 370 disposed over the pixel electrode 360. That is, a rising time of the liquid crystal may be reduced.

Further, in the case in which the voltage that is applied to the second and third liquid crystal molecules LCM2 and LCM3 of the second and third regions A2 and A3 that are symmetrical to each other with respect to the first liquid crystal molecules LCM1 of the first region A1 when the voltage is applied, a restoring force in which the second and third liquid crystal molecules LCM2 and LCM3 of the second and third regions A2 and A3 return to the initial alignment state due to the first liquid crystal molecules LCM1 of the first region A1 can be improved, and thus a falling time may be shortened.

Furthermore, the electrode patterns EP1 and EP2 are formed on the inner surface of the second substrate 320 to deform the fringe field formed by the pixel electrode 360 and the common electrode 370 in the X-axis and Y-axis directions, and the rotation angles of the liquid crystal molecules LCM1, LCM2, and LCM3 that are disposed in the first electrode pattern region B1 and the second electrode pattern region B2 are increased. Therefore, the transmittance can be improved and the driving voltage required for rotation of the liquid crystal molecules LCM of FIG. 6 for transmission of light may be reduced.

In the present disclosure, a first electrode and a second electrode having a single opening corresponding to the first electrode are provided on a first substrate and t least one electrode pattern is formed on a second substrate, and thus a high-speed response of a liquid crystal display device can be realized, transmittance can be improved, and a driving voltage can be reduced.

It will be apparent to those skilled in the art that various modifications and variations can be made in the liquid crystal display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A liquid crystal display device, comprising:
a first substrate including a plurality of pixel regions;
thin film transistors on the first substrate;
a plurality of first electrodes each electrically connected to a respective one of the thin film transistors and each in a respective one of the plurality of pixel regions;
a passivation layer on the first electrodes;
a second electrode on the passivation layer and defining an opening in each of the plurality of pixel regions;
a liquid crystal layer on the second electrode;
a second substrate on the liquid crystal layer; and
an electrode pattern on the second substrate between the liquid crystal layer and the second substrate,
wherein the electrode pattern includes a first electrode pattern vertically aligned with a side of each opening and a second electrode pattern vertically aligned with an opposite side of each opening,
wherein each opening of the second electrode has a trapezoidal shape,
wherein the trapezoidal shape includes a short side, a long side parallel to the short side, and first and second sides configured to connect the short side to the long side,
wherein each of the first and second sides is longer than each of the short side and the long side,
wherein each first electrode pattern is vertically aligned with a respective short side, and wherein each second electrode pattern is vertically aligned with a respective long side,
wherein each first electrode pattern is bar-shaped and parallel to the respective short side, and
wherein each second electrode pattern is bar-shaped and parallel to the respective long side.

2. The liquid crystal display device of claim 1,
wherein a length of the short side is 0.15 times to 0.3 times a width of the first electrode.

3. The liquid crystal display device of claim 2,
wherein a length of the long side is 0.7 times to 0.8 times a width of the first electrode.

4. The liquid crystal display device of claim 1,
wherein a length of the long side is 0.7 times to 0.8 times a width of the first electrode.

5. The liquid crystal display device of claim 1,
wherein an angle between the short side and the first and second sides is between 91° and 130°.

6. The liquid crystal display device of claim 1,
wherein a first alignment layer is between the second electrode and the liquid crystal layer, and a second alignment layer is between the electrode pattern and the liquid crystal layer.

7. The liquid crystal display device of claim 1,
wherein each opening of the second electrode has a polygonal shape that is bilaterally symmetrical.

8. The liquid crystal display device of claim 1,
wherein each first electrode pattern is shorter than the respective second electrode pattern corresponding to the same opening.

9. The liquid crystal display device of claim 1,
wherein the length of the first electrode pattern is smaller than or equal to the length of the side of each opening, and
wherein the length of the second electrode pattern is smaller than or equal to the length of the opposite side of each opening.

* * * * *